March 16, 1965 S. T. BREWER 3,174,117
TRANSMISSION SYSTEM BRANCHING CIRCUIT
Filed May 4, 1961 2 Sheets-Sheet 1

INVENTOR
S. T. BREWER
BY
Charles Scott Phelan
ATTORNEY

INVENTOR
S. T. BREWER
BY
Charles Scott Phelan
ATTORNEY 3,174,117

TRANSMISSION SYSTEM BRANCHING CIRCUIT

Sherman T. Brewer, Chatham Township, Morris County, N.J., assignor to Bell Telephone Laboratories, Incorporated, New York, N.Y., a corporation of New York Filed May 4, 1961, Ser. No. 107,790
10 Claims. (Cl. 333—3)

This invention relates to a branching circuit for electric signal transmission systems, and it is of importance particularly for branching in cable transmission systems wherein signal energy and operating energy are transmitted on the same pair of conductors.

In underwater cable systems for the transmission of voice signals over long distances, it is usual practice to employ a two-conductor cable with repeaters connected in the cable at predetermined intervals for amplifying electric signals. Repeaters are powered by direct-current energy supplied over the same two conductors which carry voice signals. The signal transmission cable must often pass through bodies of water at depths of less than 500 fathoms in areas which are popular for commercial fishing. In these areas, cable breaks due to entanglement with trawling equipment are not unusual. Accordingly, it is desirable to provide alternate routes, and means for selectively switching into operation a desired route pattern, for the transmission of signals through such waters.

Electromagnetic relays have been employed in prior art systems for switching conductors carrying both signal and power components of energy on a single conductor pair. However, due to the inaccessibility of the undersea branching points required for alternate routes in submarine cable systems, it is advisable to avoid the use of relay switches with their moving parts and of electric contacts since both are subject to a relatively high fault probability. Diode switches do not have either moving parts or electric contacts, but it is advantageous in the present state of the art to avoid the use of diode switches in a long-haul, undersea, signal path because they tend to produce more noise than is tolerable in long-haul systems.

Accordingly, it is one object of the invention to couple selectively at least one of two shallow water branch cable circuits to a deep sea main cable circuit.

Another object is to eliminate the need for relay contacts and moving parts in submarine cable branching systems.

An additional object is to increase the reliability of submarine cable systems.

The various objects of the invention are realized in one illustrative embodiment in which there is provided at a desired cable branching point means for dividing transmitted energy into separate signal energy and operating energy components. The components are themselves routed by noncontact electric circuit devices, and the operating energy activates signal repeaters in the desired route. The components are then recombined for further transmission over the selected route.

In one arrangement according to the invention, operating energy controls diode gates connected outside the signal energy path to select the signal route, and the branching of signal energy is performed by a hybrid transformer. Various other arrangements are possible for connecting a main cable section to either one of two branch cables or to more than one branch at the same time. The arrangement of the invention may also be employed in plural tandem units so that each branch circuit may be divided into further subcircuits.

One feature of the present invention is that in the vicinity of a cable branching point signal energy and operating energy are diverted to separate conduction paths and nonlinear conducting devices arranged in the operating energy path are employed to control the routing of signals between the main cable circuit and one or more of the branch cable circuits.

Another feature of the invention is that branching control circuit elements may be so arranged that signals may be routed between a main cable circuit and any one of plural branch cable circuits, while at the same time leaving other branch circuits available for repair without interruption of service in the selected branch.

An additional inventive feature is that branching control circuit elements may be so arranged that signals may be routed between a main cable circuit and one or more of plural branch cable circuits.

A more complete understanding of the invention may be obtained from a consideration of the following detailed description taken together with the attached claims and the drawings in which:

Figure 1:
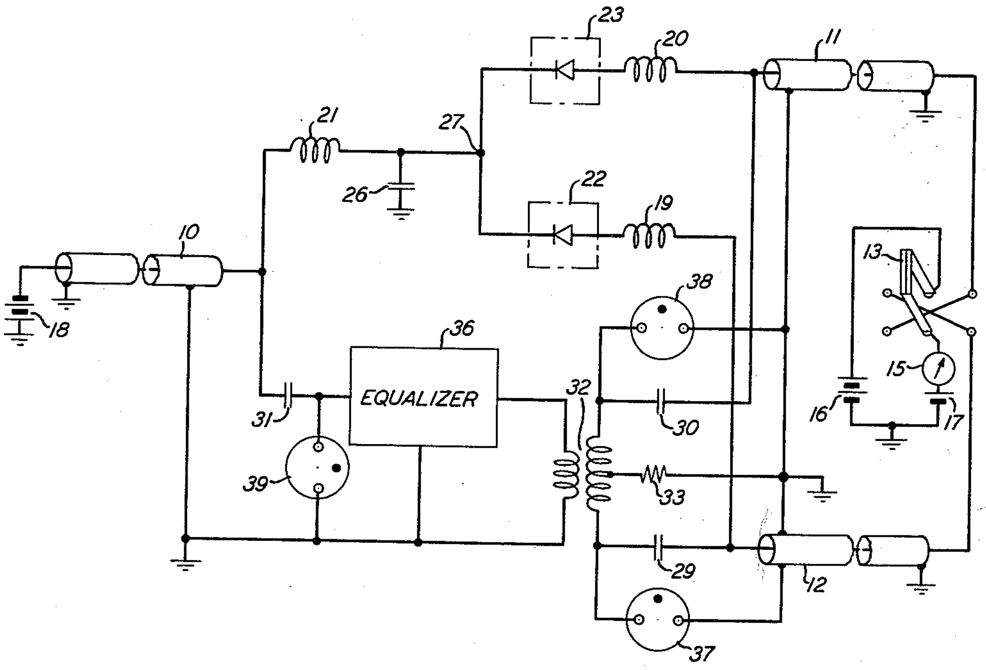
FIG. 1 is a schematic diagram of one cable branching system in accordance with the invention.

In FIG. 1, a deep sea cable 10 is to be connected to one of two shallow water branch cables 11 and 12. Both cable types comprise repeatered transmission lines. Cables 11 and 12 may terminate at one or more shore installations, which are schematically represented by the double-pole-double-throw switch 13 and the batteries 16 and 17. Battery 16 has a terminal voltage suitable for normal signal transmission operation in the cable system, whereas battery 17 should have a much smaller terminal voltage and would be used for trouble monitoring on an unused branch cable. A direct-current meter 15 connected in series with battery 17 indicates continuity in the unused branch. Switch 13 is employed to connect these batteries to the branch cables 11 and 12, respectively. Cable 10 is terminated in a battery 18 which has reverse polarity with respect to ground as compared to battery 16. The battery 18 represents a shore termination of main cable 10 in any suitable fashion, including a branching circuit as herein described.

Each of the branch cables includes one or more repeaters, and the main cable may also include signal repeaters at predetermined intervals therein. Such repeaters are powered by operating energy, usually direct-current energy, applied thereto over the same two cable conductors which carry signals in the cable system. Repeaters of this type are now well known in the art and are not shown in FIG. 1 because exact locations of such repeaters in branch and main cables comprises no part of the invention. An example of such a repeater is shown in the United States Patent No. 2,580,097 of L. N. Ilgenfritz and R. W. Ketchledge, which issued December 25, 1951.

At the branching point, illustrated in FIG. 1, of the cable system direct-current energy and signal energy are separated into separate conduction paths by frequency-responsive devices. Coils 19, 20, and 21 reject signal frequency energy and pass direct current between the center conductors of branch cables 11 and 12 and main cable 10 through diode networks 22 and 23. A shunt-connected capacitor 26 is provided for bypassing to ground any signal frequency energy which may get through the coils 19 through 21.

Diode networks 22 and 23 are shown as being poled for conduction in the same direction with respect to main cable 10. Accordingly, if switch 13 is moved to its right-hand position, the positive terminal of battery 16 is connected to the shore end of branch cable 11 and co-operates with battery 18 to bias diode network 23 for forward conduction. Battery 17 is connected to the shore end of cable 12 and tends to forward bias diode network 22. However, due to the large terminal voltage of battery 16, the voltage at the common cathode terminal 27 of diode networks 22 and 23 is more positive than the voltage of battery 17; and diode network 22 is biased nonconducting. Accordingly, direct current is unable to flow in cable section 12 and signal repeaters in that section are thus disabled. Direct current does flow from battery 16 through branch cable 11 and its repeaters, through coil 20, diode network 23, coil 21, main cable 10 and its repeaters, and battery 18. Thus, the cable route including main cable 10 and branch cable 11 is energized and available for transmission of signals.

Capacitors 29, 30, and 31 are arranged to block the passage of direct current. Signal frequency energy may be continuously coupled between branch cables 11 and 12 and main cable 10 through a hybrid transformer 32. A terminating resistor 33 is connected between a center tap on one winding of transformer 32 and ground. An equalizer 36 is connected in circuit with the other winding of transformer 32 for building out the impedance of hybrid transformer 32 and other circuit elements of the branching network to correspond to the loss of a suitable length of cable over the signal band, thereby facilitating the transmission equalization of the system.

Transformer 32 may couple signal energy between main cable 10 and either of the branch cables 11 and 12, or between the main cable and both branch cables, depending upon the pattern of energization of the branch cables. Thus, the signal path through the branching network of FIG. 1 includes main cable 10, equalizer 36, hybrid transformer 32 and branch cable 11. This signal path includes no diode elements so it is not necessary for diodes to meet strict high frequency noise or dynamic impedance requirements. Likewise, the path includes no electric contacts and no moving parts.

If it is desired to signal by means of cable 12 for any reason, it is merely necessary to operate switch 13 to its left-hand position thereby interchanging the connections of batteries 16 and 17. This action reversely biases diode network 23 and forward biases diode network 22 to de-energize branch cable 11 and energize branch cable 12. Signal transmission can now be conducted between branch cable 12 and main cable 10.

Gaseous discharge tubes 37, 38, and 39 are connected in circuit in all of the respective ports of the branching system to provide protection against unusually large surge voltages.

Figure 2:
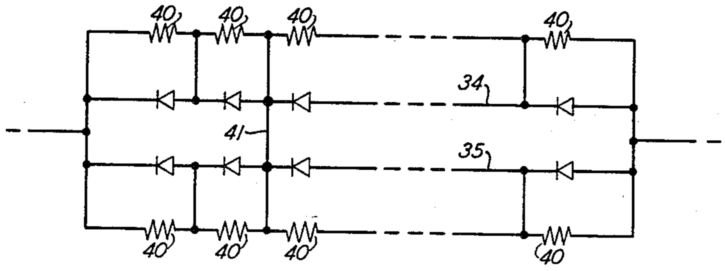
FIG. 2 is a schematic diagram of a diode network of the type that may be employed in certain cable systems in conjunction with the invention.

In FIG. 2, there is illustrated a diode network of a type which may be employed for the diode networks 22 and 23 in a cable system which will operate at high voltages and which must be characterized by a high degree of reliability. This network includes, in parallel, two strings 34 and 35 of series-connected diodes. All diodes are poled for conduction in the same direction. A separate resistor 40 is connected in parallel with each diode, and in the normal course of events all of the resistors 40 would have the same resistance. If a diode in one string should become open-circuited, the diodes of the other string in the network would maintain conduction. A sufficient number of diodes is included in each string so that a limited number could be short-circuited without too seriously affecting system performance.

One or more connections 41 may be provided between corresponding points on the two strings of diodes as an additional precautionary measure. If a diode in each string of the network of FIG. 2 should become open-circuited, and the faulty diodes were on opposite sides of a connection 41 from one another, the operative portions of each string could still co-operate as a single good string including the connection 41.

The number of diodes and resistors employed in any one network of the type illustrated in FIG. 2 depends upon the nature of the system in which they are to be used. A sufficient number of diodes must be employed in any one over-all series path between shore terminals so that the direct operating voltage of the system supplied from a terminal cannot damage any diode in the system. The resistance of corresponding parallel connected resistors must be similarly selected to distribute reverse voltages on the diodes evenly among the various diodes.

Figure 3:
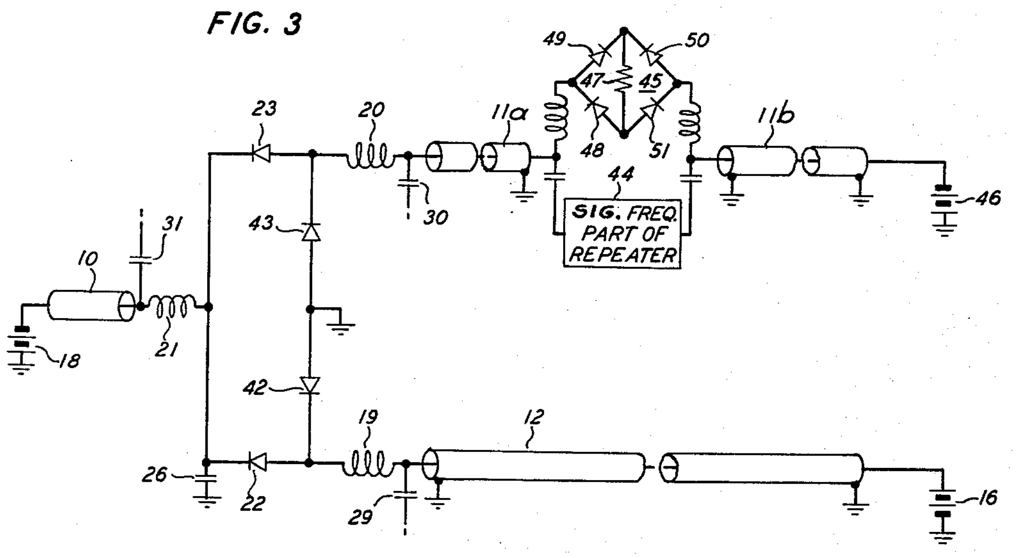
FIG. 3 is a partial schematic diagram of an additional embodiment of the invention.

The direct-current portion of a somewhat modified cable branching system is illustrated in FIG. 3, and circuit elements corresponding to those shown in FIG. 1 are designated by similar reference characters. Alternating current portions of the circuit schematically indicated by partial connections for capacitors 29, 30, and 31 are not shown in FIG. 3 because they are the same as those in FIG. 1. In this scheme, the circuit is altered somewhat in order to permit transmission between main cable 10 and both of the branch cables at the same time. A pair of diode networks 42 and 43 is added in a series circuit between the two branches. Networks 42 and 43 are poled for opposite conduction with respect to one another in their series circuit, and their common anode junction is connected to ground. Shore-end connections are also modified somewhat in that battery 16 is now connected to cable 12, and an additional battery 46 of opposite polarity with respect to battery 16 is connected to branch cable 11.

Diode networks 22 and 23 function as previously described to energize main cable section 10 and branch cable 12 from batteries 16 and 18. The operating voltage in branch cable 12 also reversely biases diode network 42 to prevent conduction between branch cable 12 and ground through that diode. In cable 11, however, battery 46 supplies operating current through ground, diode network 43, coil 20 and cables **11*a* and 11*b*. Repeaters in all parts of the cable system in cable 11 may be either a two-wire type or an equivalent four-wire type, and a typical repeater is indicated in simplified form between cable sections 11*a* and 11*b* to show one way in which the direct current portion of the repeater may be adapted to function with an operating energy supply of either polarity. The high frequency portion of such a repeater is schematically represented by the block 44 in FIG. 3. Operating potential for the repeater is developed across a resistor 47 connected across one diagonal of a full-wave rectifier circuit 45 which includes the diodes 48 through 51. This arrangement permits the repeater to be energized by direct current applied with either polarity. Since battery 46 need be adapted to handle only the number of repeaters in branch cable 11, its terminal voltage may be lower than the terminal voltage of battery 16 and the two batteries co-operate to bias diode network 23** nonconducting, thereby preventing interference between the two operating energy supply paths.

The direction of application of operating energy is independent of the direction of signal transmission in the cable. It is, therefore, apparent that signal transmission may take place between main cable 10 and both of the branch cables 11 and 12 at the same time in the alternating current portion of the branching circuit. In like manner, any interruption of service in one of the branch cables does not affect service in the other. This arrangement is particularly flexible, since each of the shore terminals for the branches 11 and 12 may be adapted, if desired, to handle exclusively different bands of frequencies in signals transmitted on the over-all system; or both branch cables may handle exactly the same traffic at the same time. Also, the batteries 16 and 46 may be interchanged without affecting the operation of the system insofar as signals are concerned. Such a change would cause diodes 43 and 22 to be biased nonconducting and diodes 23 and 42 to be biased conducting so that branch cable 11 would then be powered over the entire system including main cable 10, and branch cable 12 would be powered exclusively by its shore-end battery.

Figure 4:
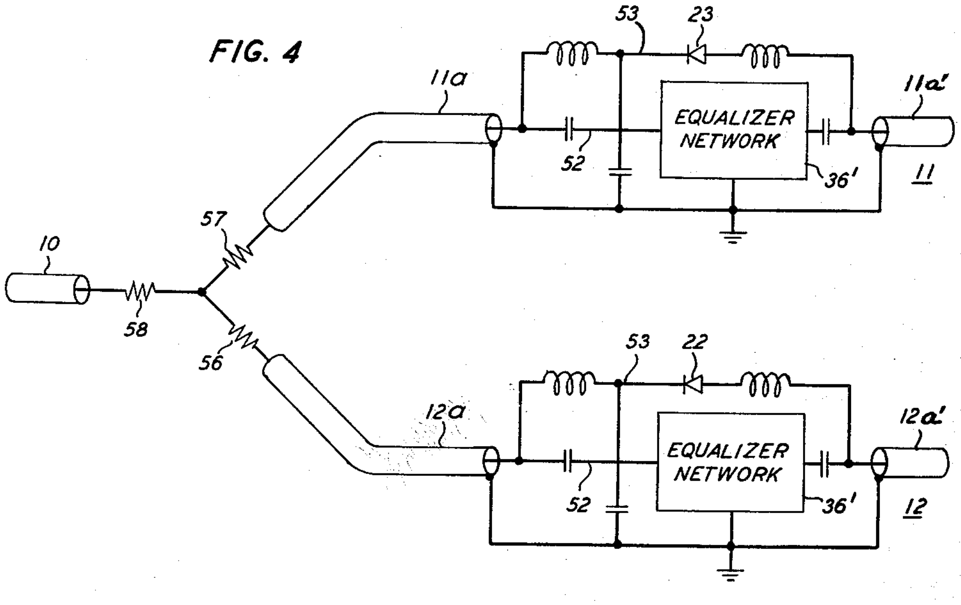
FIG. 4 is a schematic diagram of a further embodiment of the invention.

A somewhat different approach to the branching problem is illustrated in FIG. 4 wherein only the branching network is shown, and no system terminals or repeaters are indicated. The underlying branching principles are still the same, but the physical arrangement is different. Circuit elements in FIG. 4 corresponding to those shown in FIGS. 1 and 3 are indicated by similar reference characters. With this scheme, separate paths for signal energy and operating energy are provided in a portion of each of the branch cables 11 and 12. These separate paths for the different energy components may take the form of parallel-connected filter networks, such as the high-pass filters 52 and the low-pass filters 53. These filters are connected between cable portions 11*a* and 11*a'* of branch cable 11 and between portions 12*a* and 12*a'* of branch cable 12. Diode networks 22 and 23 are connected in series in their corresponding low-pass filter networks 53 to provide routing control for the two cable branches in much the same manner described in connection with FIG. 1. Equalizing networks 36' are connected in high-pass filters 52.

A star pad of resistors 56, 57, and 58 is provided to accomplish the actual physical connection among the cable conductors. Each of these resistors should have a resistance which is approximately equal to one-third of the characteristic impedance of the cable. Resistors 56 through 58 can be molded directly in the cable body and require no separate housing. They also supply conduction means for continuously coupling signals between main cable 10 and branch cables 11 and 12.

Filter networks 53 with their associated diode networks 22 and 23, and filter networks 52 with their equalizing networks 36', may be located in separate equipment housings connected into the respective branch cables at a distance from the actual cable junction point. The system of FIG. 4, although requiring a somewhat greater number of circuit elements than do the previously described embodiments, has an additional element of flexibility. If, for example, one of the filter networks 52 or 53 in branch cable 11 should become faulty, transmission may be switched to branch cable 12 and continued without interruption, while branch cable 11 is raised for repair. This feature is not available in the other described embodiments since all of the equipment required in those cases would normally be located within a single equipment housing in order to permit the connections that are required between the branch cables.

Although this invention has been described in connection with particular embodiments thereof, it is to be understood that additional embodiments and modifications which would be obvious to one skilled in the art are included within the spirit and scope of the invention.

What is claimed is:

1. A transmission line branching system comprising a main transmission line and at least two branch transmission lines, each adapted for the transmission of signal energy and operating energy on the same conductor pair, means in each of said branch lines separating high and low frequencies into separate paths for a portion of such branch line, said separating means comprising inductive circuits connected in each of said branch lines, diode means connected in series in each of said inductive circuits for disabling low frequency conduction in the respective branch line in response to a predetermined low frequency voltage level, and means continuously coupling signals between said main and branch transmission lines.

2. The transmission line branching system in accordance with claim 1, in which said continuous coupling means comprises a hybrid transformer coupling said signals between said main line and said branch lines.

3. The transmission line branching system in accordance with claim 1, in which said diode means in each of said branch lines is poled for conduction in the same direction with respect to said main line, and means connected to one of said branch lines forward biases said diode means therein.

4. The transmission line branching system in accordance with claim 1, in which said diode means in each branch line is poled for conduction in the same direction with respect to said main line, two additional diode means are connected in series between the low frequency paths of said two branch lines, said additional diode means being poled for conduction in opposite directions, means connect the common junction point between said additional diode means to one conductor of said pair in each of said lines, and means apply between said one conductor and the other conductor of each of said branch lines potentials of opposite polarity tending to forward bias one of said additional diode means.

5. The transmission line branching system in accordance with claim 1, in which two additional diode means are connected in series between the low frequency paths of said two branch lines, and means apply potentials to said lines for biasing one of said first-mentioned diode means and one of said additional diode means for conduction to enable signal transmission in all of said lines.

6. The transmission line branching system in accordance with claim 1, in which said separating means comprises a high-pass filter and a low-pass filter connected in parallel in each of said branch lines, and said low-pass filter includes said inductive circuit of the corresponding branch line.

7. A transmission line branching system comprising a main transmission line and at least two branch transmission lines, each adapted for the transmission of signal energy and operating energy on the same conductor pair, high-pass and low-pass filter means connected in parallel in each of said branch lines for separately transmitting said signal energy and said operating energy, voltage responsive means in each of said branch lines connected in series with said low-pass filter thereof for disabling operating energy transmission in the respective branch line in response to a predetermined low frequency voltage level, and means continuously coupling signals between said main and branch transmisison lines.

8. The transmission line branching system in accordance with claim 7, in which said continuous coupling means comprises a three-terminal resistance network having one terminal connected to a conductor of said main transmission line and having the remaining two terminals connected to a conductor of each of the branch transmission lines.

9. In an electric signal transmission system a main cable section, at least two branch cable sections, each of said cable sections adapted for the transmission of both signal energy and operating energy over the same two conductors of its respective cable section, diode means connected in each of said branch sections, and responsive to the application of operating energy to a corresponding one of said branch sections for completing a direct-current conduction path for said operating energy to said main section, and means separately conducting signal energy between said one branch section and said main section.

10. In an electric signal transmission system including a plurality of signal repeaters interconnected by sections of transmission line having at least one conductor pair and in which operating energy is transmitted to said repeaters over the same conductor pair which carries signal energy, a main transmission line, two branch transmission lines, a branching network for interconnecting said main line and at least one of said branch lines, said network comprising inductance means continuously coupling signal energy between said main line and said branch lines, two diode means each connected in series between said main line and a different one of said branch lines, and filter means routing signal energy to said continuous coupling means and operating energy to said diode means.

References Cited in the file of this patent

UNITED STATES PATENTS

| | | |
|---|---|---|
| 2,658,945 | Bramhall et al. | Nov. 10, 1953 |
| 2,831,984 | Ebers | Apr. 22, 1958 |

OTHER REFERENCES

Kimbark: Electrical Transmission of Power and Signals, John Wiley and Sons, New York, 1949, FIGS. 12–11 relied upon.

Rogers, Theory of Networks. MacDonald & Co., London, 1957, pages 200–203, 421–429 relied upon.

The Radio Amateurs Handbook, 1958 Edition, pages 225–227 relied upon.